(12) United States Patent
Ercan et al.

(10) Patent No.: US 10,574,322 B2
(45) Date of Patent: Feb. 25, 2020

(54) SYSTEM AND METHOD FOR SERVICE GROUP BASED DYNAMIC OPTIMIZATION OF WWAN WLAN AGGREGATION

(71) Applicant: NETSIA, INC., Sunnyvale, CA (US)

(72) Inventors: Ali Ozer Ercan, San Jose, CA (US); Mehmet Oguz Sunay, San Francisco, CA (US)

(73) Assignee: NETSIA, INC., Sunnyvale, CA (US)

( * ) Notice: Subject to any disclaimer, the term of this patent is extended or adjusted under 35 U.S.C. 154(b) by 71 days.

(21) Appl. No.: 15/849,647

(22) Filed: Dec. 20, 2017

(65) Prior Publication Data

US 2018/0175924 A1 Jun. 21, 2018

Related U.S. Application Data

(60) Provisional application No. 62/436,649, filed on Dec. 20, 2016.

(51) Int. Cl.
*H04W 4/00* (2018.01)
*H04B 7/06* (2006.01)
*H04W 28/02* (2009.01)
*H04W 24/10* (2009.01)
*H04W 72/04* (2009.01)
*H04W 84/12* (2009.01)

(52) U.S. Cl.
CPC .......... *H04B 7/0626* (2013.01); *H04W 28/02* (2013.01); *H04W 24/10* (2013.01); *H04W 72/04* (2013.01); *H04W 84/12* (2013.01)

(58) Field of Classification Search
CPC ..... H04W 88/06; H04W 76/15; H04W 48/06; H04W 4/70; H04W 84/12; H04W 88/16; H04W 28/085; H04W 72/0486; H04W 76/27; H04W 88/08
See application file for complete search history.

(56) References Cited

U.S. PATENT DOCUMENTS 8,817,623 B2 8/2014 Gupta et al.
9,119,154 B2 8/2015 Etemad et al.
(Continued)

OTHER PUBLICATIONS

R. Sigle, "MRA Architecture, Mobile and Wireless Systems beyond 3G," Internet Citation, Feb. 17, 2005, 70pgs.
(Continued)

*Primary Examiner* — Sai Aung
(74) *Attorney, Agent, or Firm* — IP Authority, LLC; Ramraj Soundararajan

(57) ABSTRACT

A service group based dynamic optimization of WWAN and WLAN aggregation in user equipment (UE) is described. The UE has a first radio access technology (RAT) interface associated with a Wireless Wide Area Network (WWAN) based interface that is served by a corresponding base station (BS), and a second RAT interface associated with a Wireless Local Area Network (WLAN) based interface that is served by an Access Point (AP), wherein, for downlink communications, the first and second RAT interfaces are aggregated. Each UE belongs to at least one service group, wherein the UE performs service group based dynamic optimization of WWAN and WLAN aggregation, with flow split ratios and resource allocation between RAT interfaces being jointly optimized for each service group and each RAT interface.

7 Claims, 5 Drawing Sheets

(56) References Cited

U.S. PATENT DOCUMENTS

| | | |
|---|---|---|
| 9,294,926 B2 | 3/2016 | Pragada et al. |
| 2014/0050086 A1 | 2/2014 | Himayat et al. |
| 2014/0133456 A1 | 5/2014 | Donepudi et al. |
| 2014/0341109 A1 | 11/2014 | Cartmell et al. |
| 2014/0369329 A1 | 12/2014 | Lee et al. |
| 2015/0049707 A1* | 2/2015 | Vajapeyam ........... H04W 24/10 370/329 |
| 2015/0188681 A1 | 7/2015 | Li et al. |
| 2015/0189551 A1* | 7/2015 | Ozturk ................. H04W 28/08 370/235 |
| 2015/0350952 A1 | 12/2015 | Ozturk et al. |
| 2015/0350954 A1 | 12/2015 | Faccin et al. |
| 2016/0037380 A1 | 2/2016 | Ozturk et al. |
| 2016/0088542 A1 | 3/2016 | Belghoul et al. |
| 2017/0078890 A1* | 3/2017 | Zhu ....................... H04W 16/14 |
| 2017/0118793 A1* | 4/2017 | Liu ................... H04W 72/0446 |
| 2017/0171903 A1* | 6/2017 | Kubota ............... H04L 41/0672 |
| 2018/0352477 A1* | 12/2018 | Singh ................ H04W 28/085 |
| 2018/0376366 A1* | 12/2018 | Singh .................. H04W 24/10 |

OTHER PUBLICATIONS

Nokia et al., "Requirements of Isolation Between Network Slices," 3GPP Draft; R3-161358, 3GPP TSG-RAN WG3 Meeting #92, Nanjing, China, May 23, 2016, 4pgs.

C. Prabhakar et al., "TR196 Enhancements Presentation to SA5 & BBF," Small Cell Forum, May 5, 2016, 26pgs.

\* cited by examiner

SYSTEM AND METHOD FOR SERVICE GROUP BASED DYNAMIC OPTIMIZATION OF WWAN WLAN AGGREGATION

RELATED APPLICATION

This application claims the benefit of provisional application 62/436,649 filed Dec. 20, 2016.

BACKGROUND OF THE INVENTION

Field of Invention

The present application pertains to programmable link aggregation of wireless wide-area network and wireless local area network radio access technologies.

Discussion of Related Art

The patent specification U.S. Pat. No. 9,294,926 B2 presents a method and apparatus for integrating 3GPP and IEEE 802.11 radio access technologies. Architectures for integrating these interfaces at the MAC layer or below the MAC layer are specified. New interfaces between the 802.11 access point (AP) and another AP, eNB and AP are defined. Signaling for various operations such as measurement reporting, mobility, etc. are specified. A session management entity is described for the coordination of the 3GPP radio resource control entity and 802.11 MAC.

The patent specification U.S. Pat. No. 9,119,154 B2 specifies architectures and procedures for the integration of WWAN (such as LTE or WiMAX) and WLAN (such as Wi-Fi or Bluetooth) radio access technologies where WWAN is regarded as the primary cell and WLAN is regarded as the secondary cell. A multi-RAT aggregation and coordination module is specified within the radio resource control unit of the primary radio that coordinates the use of secondary radio at the unlicensed spectrum for data transfer. In a similar setup, the patent application US 2014/0050086 A1 specify system and methods for offloading traffic from WWAN to WLAN at the IP, PDCP, RLC or MAC layers managed by a radio resource controller (RRC) or a MAC scheduler with RRC control. Another related patent specification U.S. Pat. No. 8,817,623 B2 describe methods for the aggregation of WWAN and WLAN carriers, where, discovery, association and flow switching techniques are disclosed. A dynamic flow mapping module forms a flow-mapping table and a routing module routes the flows to one of WWAN and WLAN radios based on the flow mapping table.

The patent application US 2016/0037380 A1 disclose techniques and apparatus for scheduling in wireless networks using traffic aggregation, where the user equipment (UE) is associated with two radio access technology (RAT) access points, receives parameters from the first access point (AP) for scheduling communications with the second AP. The parameters used for scheduling can include maximum packet size or packet size to communicate with the second AP, target or maximum throughput to communicate with the second AP, transmit buffer status report, ratio of the utilized resources, throughputs, buffer levels, etc., in communication to first and second AP, etc.

The patent application US 2015/0350954 A1 specifies methods, apparatus and architectures for routing data bearers, when the user equipment is associated with the base station of the first radio access technology and served by the base station of a second radio access technology.

The patent application US 2015/0350952 A1 discloses priority based mechanisms to handle conflicting triggers related to WWAN-WLAN offloading and aggregation. The priority rules are determined based on received configuration information and the UE may give priority to aggregation (or offloading) over offloading (or aggregation) based on the priority rules.

The patent application US 2014/0369329 A1 specify techniques for the aggregation of LTE and Wi-Fi radio access technologies, that select the LTE, Wi-Fi or both interfaces for the transmission of data packets to a user equipment. Selection criteria such as link qualities, link loads, backhaul loads, etc. are suggested.

The patent application US 2014/0341109 discloses a converged gateway (CGW) that makes policy based routing decisions such as segregation/aggregation of flows, for aggregated RATs. Goals and techniques such as dynamic flow management, load balancing, offloading, etc. may be provided or implemented by the suggested CGW. The patent application describes methods for identifying the type of the received flow using shallow or deep packet inspection and transmitting the flow via the first or second RAT based on stored policy and flow identification result.

The patent application US 2014/0133456 A1 specifies systems and methods for the dynamic virtualization of multi-access wireless networks where a heterogeneous mesh network of multiple RATs are connected to a cloud component, which appears to all radio access technologies as a single virtual base station. Paging and handover strategies are presented.

Embodiments of the present invention are an improvement over prior art systems and methods.

SUMMARY OF THE INVENTION

In one embodiment, the present invention provides a system for service group based dynamic optimization of WWAN and WLAN aggregation in user equipment (UE), the UE comprising: a first radio access technology (RAT) interface, the first RAT interface comprising a Wireless Wide Area Network (WWAN) based interface that is served by a corresponding base station (B S); a second RAT interface, the second RAT interface comprising a Wireless Local Area Network (WLAN) based interface that is served by an Access Point (AP); wherein, for downlink communications, the first and second RAT interfaces are aggregated; and wherein each UE belonging to at least one service group, and wherein the UE performing service group based dynamic optimization of WWAN and WLAN aggregation, where flow split ratios and resource allocation between RAT interfaces are optimized jointly for each service group and each RAT interface.

In another embodiment, the present invention provides for a system for service group based dynamic optimization of WWAN and WLAN aggregation in user equipment (UE), the UE comprising: a first radio access technology (RAT) interface, the first RAT interface comprising a Wireless Wide Area Network (WWAN) based interface that is served by a corresponding base station (BS); a second RAT interface, the second RAT interface comprising a Wireless Local Area Network (WLAN) based interface that is served by an Access Point (AP); wherein, for downlink communications, the first and second RAT interfaces are aggregated; and wherein each UE belonging to at least one service group, the at least one service group associated with a group profile defining a collection of attributes, the attributes comprising any of, or a combination of, UEs, BSs, and Aps for which the group profile is defined for, the control algorithms associated with the at least one service group, percentage of wireless resources allocated to the at least one service group, downlink and uplink data rate limits assigned to the at least one service group; and wherein the UE performing service group based dynamic optimization of WWAN and WLAN aggregation, where flow split ratios and resource allocation between RAT interfaces are optimized jointly for each service group and each RAT interface.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 3 illustrates an example of control plane and data/user plane split in the virtual MAC and physical MAC layers at the WWAN BS, as well as the interfaces in between.

DESCRIPTION OF THE PREFERRED EMBODIMENTS

Figure 1:
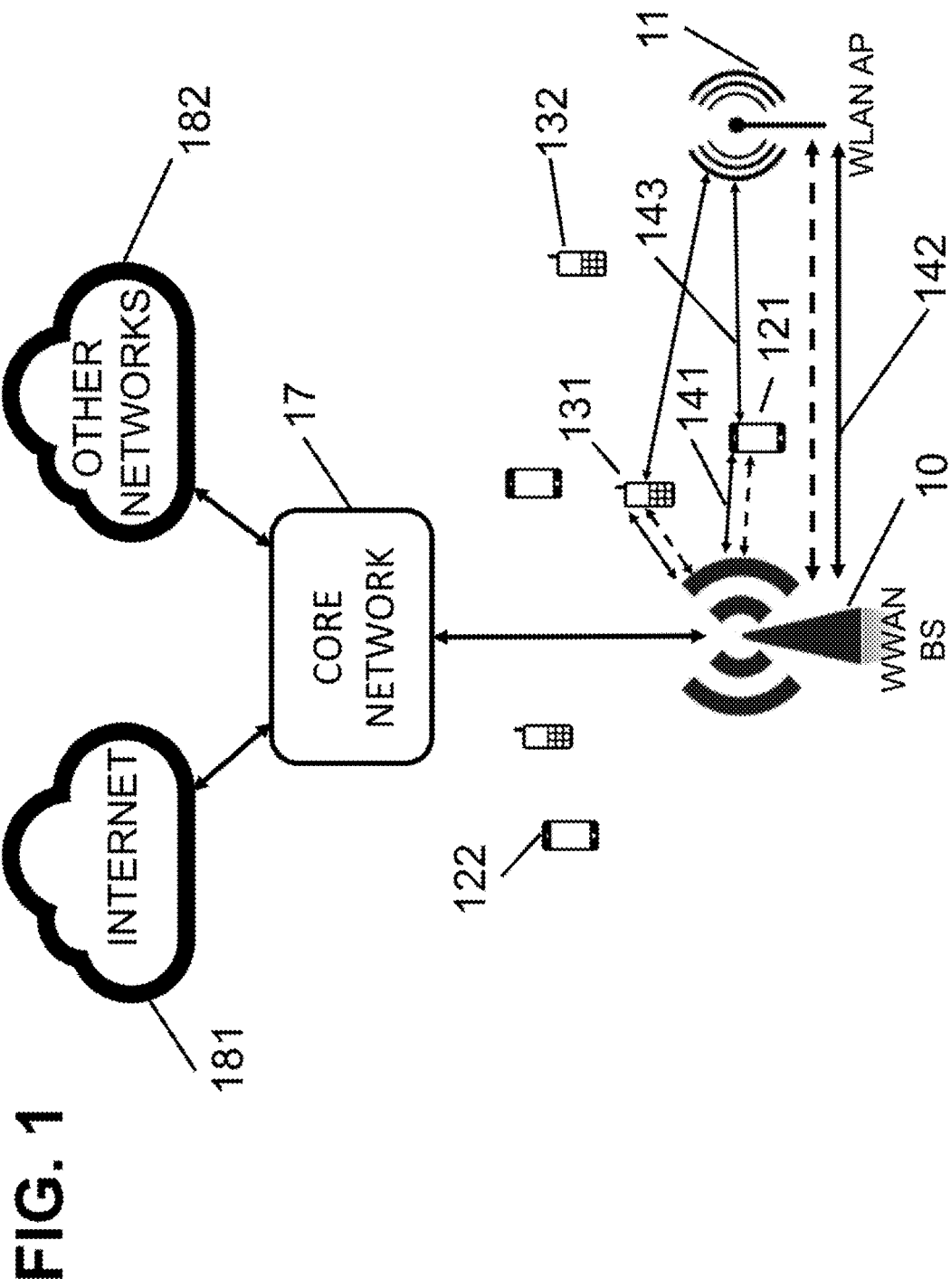
FIG. 1 shows the architecture assumed by the invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The present invention considers a wireless network where user equipments (UEs) have multiple radio access technologies (RATs). The invention assumes the first RAT is of a Wireless Wide Area Network (WWAN) technology, such as LTE, WiMAX, UMTS, etc., or any other future WWAN technology. The invention assumes the second RAT is of a Wireless Local Area Network (WLAN) technology, such as the IEEE 802.11 family, or any other future WLAN technology. The invention considers the case in which the two RATs are aggregated, that is, flows destined to UEs may be sent via the WWAN base station (BS), WLAN access point (AP), or both.

The UEs are grouped together so that each group may be subjected to its own set of medium access (MAC) protocols for each RAT. The network operator or service provider that serves a plurality of subscribers defines a service group for said plurality of subscribers and controls the corresponding virtualized MACs for the said service group. The grouping of users or flows of users into service groups may be in one or more of the following ways:

In an environment where one mobile network operator (MNO) and one of more mobile virtual network operators (MVNOs) utilize the same spectrum, users may be grouped according to their network operator subscriptions, Users may be grouped according to their service subscription profiles, Users may be grouped according to their geography and time specific radio resource reservation requests, Flows of users may be grouped according to flow profiles where a flow profile includes but is not limited to the following: flow type, flow header contents, over-the-top service provider identity.

According to the invention, virtual medium access control layers (vMACs) for all existing service groups and for both radios run on top of the WWAN and WLAN medium access control layers, which may be programmatically invoked, modified or terminated on each base station at a given time. Each vMAC at WWAN BS or WLAN AP may be allocated a portion of the available wireless resources and may run its own scheduler which is responsible from deciding which of its allocated subscriber flows are to be served on its allocated portion of the wireless resources. The split between the two radios for each flow and the allocation of the wireless resources to each service group vMAC are optimized jointly all service groups. The invention discloses methods to perform this optimization dynamically.

The invention assumes the underlying WWAN MAC allocates virtual resource blocks (vRBs) to the WWAN vMACs. In the invention, the mapping of these vRBs to the physical RBs is decoupled from the individual schedulers of the WWAN vMACs and is conducted by the underlying MAC of the WWAN base station. In the system, the scheduler of each WWAN vMAC maps the head-of-line packets of the scheduled user flows to the vRBs that it governs. Once the decisions on how to utilize the virtual resources are complete for each WWAN vMAC, the underlying WWAN MAC conducts the vRB to physical RB mapping. On the other hand, random channel access model is assumed for WLAN. As such, the allocation of WLAN wireless resources to service groups is performed by configuring WLAN MAC and WLAN vMAC schedulers appropriately, e.g., by setting rates, priorities, maximum rates, etc. of the schedulers.

According to the invention, the WWAN BS and WLAN AP collect channel state information (CSI) from the UEs. For the WWAN, the channel state information may be the channel quality indicator (CQI) per UE and per resource block (RB). If the CSI information for some UEs or RBs are not available, these may be interpolated/estimated from CSI information of other UEs and/or RBs. For the WLAN, the channel state information contains, and is not limited to, the wireless channel busy and idle statistics, the wireless channel noise level, per UE received signal strength/quality indicator, per flow instantaneous achieved data rate, per UE and per MCS packet error rate statistics, etc. Similarly, missing information for some UEs may be interpolated/estimated from existing CSI. The MAC layers of both radios compute virtual CSI (vCSI) per UE, given the CSI. The vCSI information is passed to the vMAC entities, where expected throughput per flow belonging to each service group is computed using the vCSI information. A controller entity computes optimal flow splitting ratios for all service groups jointly using expected throughputs, vMAC queue states, flow rates, QoS requirements, service group attributes, etc. Given the flow split ratios, the WWAN vMAC decides on the number of vRBs that it needs in order to fulfil these rates and requests them from the WWAN MAC. Then given the vRBs, WWAN vMAC assigns the packets from flows on the vRBs. The WWAN MAC maps the vRBs to actual RBs and conducts wireless transmissions accordingly. Given the optimal rate allocations from the controller, the WLAN vMAC and MAC entities construct and configure their schedulers in the user plane to slice the wireless resources in a manner to be able to serve the specified data rates.

A number of related art to the presented invention are summarized above. Most of these art focus on methods on the architectures and optimization of multi-RAT aggregation and do not consider virtualization of RATs. The patent application US 2014/0133456 A1 aims to virtualize multiple RAT interfaces present in a heterogeneous mesh network, such that all nodes in the network are presented with an API as if they are connected to a single base station in the cloud. The purpose of the presented invention is quite the opposite from this patent application. The presented invention uses virtualization to allocate and isolate wireless resources for different service groups and provide each group with their own MAC layer, as if each service group is operating independently under a virtualized base station. The disclosed invention further specifies system and methods for service group based dynamic optimization of WWAN WLAN aggregation, where flow split ratios and resource allocation is optimized for each service group and for each radio access technology jointly.

The wireless network architecture assumed by the invention is depicted in FIG. 1. Plurality of user equipments (UEs) have multiple interfaces for multiple radio access technologies (RAT). The invention assumes the first RAT is of a Wireless Wide Area Network (WWAN) technology, such as LTE, WiMAX, UMTS, etc., or any other future WWAN technology. The invention assumes the second RAT is of a Wireless Local Area Network (WLAN) technology, such as the IEEE 802.11 family, or any other future WLAN technology. Each RAT interface is served by its corresponding base station/access point. The invention considers the case in which the two RATs are aggregated, that is, flows destined to UEs may be sent via the WWAN BS, WLAN AP, or both. There may exist different service groups that the said UEs belong to. The invention specifies system and methods for service group based dynamic optimization of WWAN WLAN aggregation, where flow split ratios and resource allocation is optimized for each service group and for each radio access technology jointly.

In FIG. 1, plurality of user equipments (UE) such as (121), (122), (131), (132) have multiple interfaces for multiple radio access technologies (RAT). The invention assumes the first RAT is of a Wireless Wide Area Network (WWAN) technology, such as LTE, WiMAX, UMTS, etc., or any other future WWAN technology. The invention assumes the second RAT is of a Wireless Local Area Network (WLAN) technology, such as the IEEE 802.11 family, or any other future WLAN technology. Today's smart mobile devices commonly have radios to access both such WWAN and WLAN networks. In FIG. 1, (10) represents the base station (BS) serving the WWAN, which may be a macro or small cell BS. On the other hand, (11) represents the access point (AP) serving the WLAN. The invention considers a scenario in which the two RATs are aggregated, that is, flows destined to UEs may be sent via the WWAN BS, WLAN AP, or both. The invention assumes that the link aggregation is performed in the downlink. The uplink traffic is assumed to use WWAN only.

The invention assumes there may exist different service groups that the said UEs belong to. In the figure, as an example, UEs belonging to two service groups are depicted by using different icons for the UEs. The UEs (121), (122) belong to one service group and (131), (132) belong to another service group. It may also be the case that a UE may belong to more than one service group, or a UE may belong to different service groups at different times or locations. On the other hand, there may not be any distinction of the UEs based on the service groups, which is equivalent to all UEs belonging to the same service group. Thus, the invention's service group definition covers all of these cases.

The collection of attributes for a service group is called "group profile," and may consist of properties such as, and not limited to, the user equipments and base stations/access points for which the profile is defined for, the control algorithms (e.g., admission control, scheduling, handover, etc.) used for said service group, percentage of wireless resources allocated to said service group, downlink and uplink data rate limits assigned to said service group, etc.

The invention specifies system and methods for service group based dynamic optimization of WWAN WLAN aggregation, where flow split ratios and resource allocation is optimized for each service group and for each radio access technology jointly. In FIG. 1, the solid lines denote the data communications between different entities and the dashed lines denote the control signaling. A data flow from the internet (181) or other networks (182) goes through the core network of WWAN (17). An example for such an entity can be the EPC if WWAN is LTE, however the invention is not limited to any standard, and is also applicable to any similar architecture of future standards. From the core network, the flow arrives at the WWAN BS (10). In one embodiment, the flow is transmitted to the destination UE via the WWAN connection only (e.g., link 141). In another embodiment, the flow is offloaded to the WLAN AP (via connection 142) and then transmitted to the destination UE via the WLAN connection only (e.g., link 143). In another embodiment, the flow is split into two at the WWAN BS, and part of the flow is transmitted to the destination UE via the WWAN connection (e.g., link 141) and the rest of the flow is sent to the WLAN AP (via connection 142) and then transmitted to the destination UE via the WLAN connection (e.g., link 143). In either case, a computer program running at the UE collects the flow's packets from either interface, puts them together, takes care of retransmission requests and/or reordering of the packets, and delivers them to the targeted application. In the latter case when a flow is transmitted using both RATs, the optimization of the split to two interfaces is performed dynamically using information such as link qualities, signal strength/quality indicators, instantaneous traffic rates, etc. Such information is collected from the UEs and the WLAN AP via the control communications depicted in dashed lines in FIG. 1.

In one embodiment, the WWAN may be LTE and WLAN may be belonging to the IEEE 802.11 family (Wi-Fi). In this case, as detailed in the 3GPP Release 13, two ways of aggregating LTE and Wi-Fi links are as follows. When packets for a flow arrive at the LTE eNB, before the PDCP layer, some packets may be sent as IP packets via IPsec tunneling to the Wi-Fi AP to be delivered to the UE that the said flow is destined to. This case is called LWIP. Alternatively, some packets of the flow can be sent to the Wi-Fi after the PDCP layer before the RLC layer. This is called LWA. In this case, the PDCP packets are encapsulated into IP packets which carry bearer identity, using an adaptation layer (LWAAP). At the UE, the received packets of the flow from two RATs are combined into a single flow. This invention is applicable to LWA and LWIP technologies but not limited to them. More importantly, disclosed invention's novelty is complementary to LWA, LWIP or any other existing art on link aggregation, as it discloses methods for joint optimization of flow split ratios and resource allocation to each service group and each RAT in a dynamic fashion.

Figure 2:
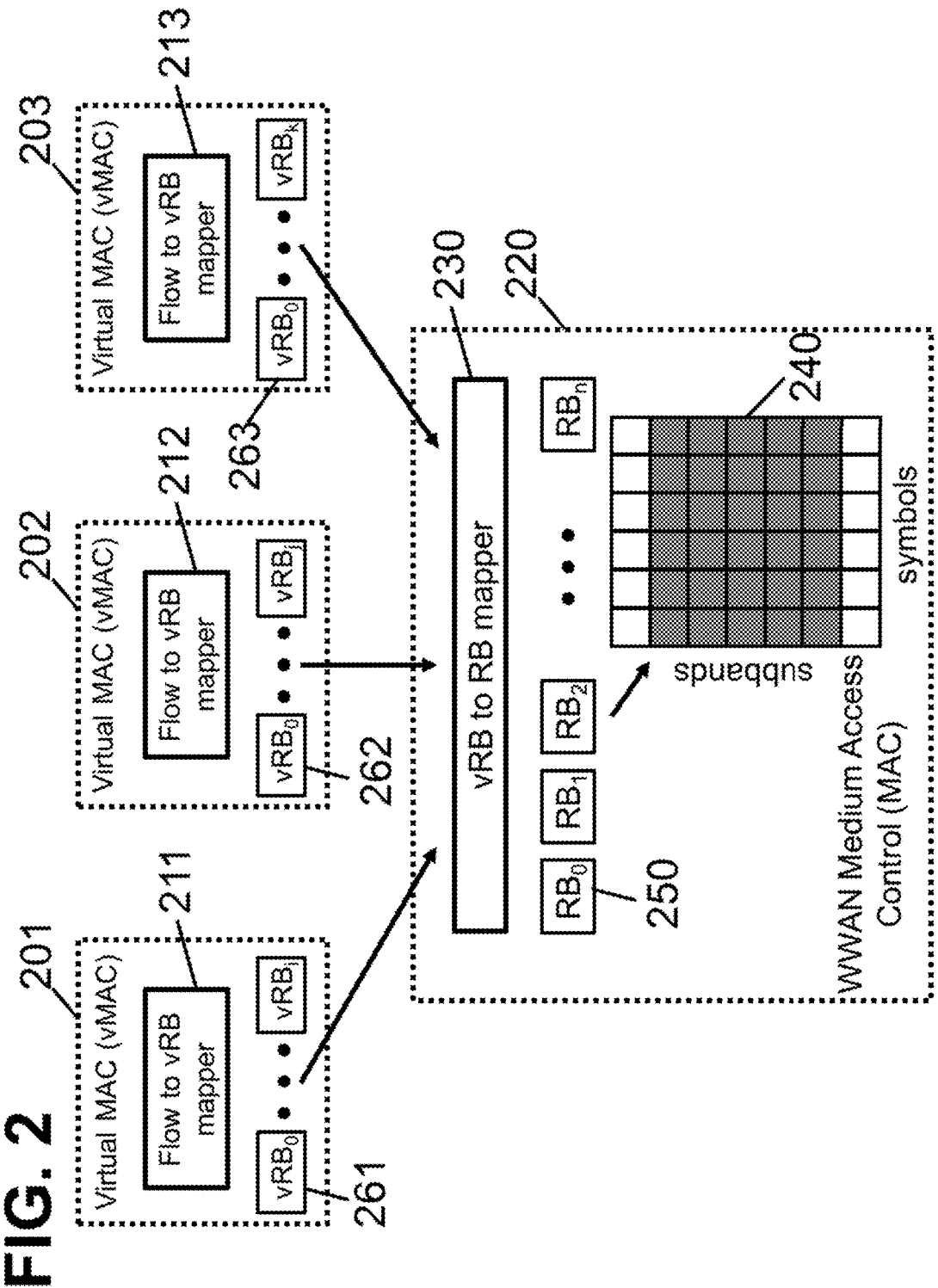
FIG. 2 depicts a typical embodiment for WWAN virtualization.

According to the invention, both wireless networks are virtualized, as such, each service group is subjected to its own medium access control (MAC) protocol. A typical embodiment for WWAN virtualization as depicted in FIG. 2.

MAC layer has a fixed number of resource blocks (RB). Unlike traditional systems, where MAC layer assigns resource blocks directly to wireless user equipment (UE), MAC layer in this invention is assumed to assign physical resource blocks (RBs) to virtual Resource Blocks (vRBs). The MNO virtualizes the medium access control by instantiating virtual MAC (vMAC) slices within a base station for distinct service groups serving their own users over the same physical network. The MAC layer assigns vRBs to virtual MAC layers. The number of vRBs assigned to each vMAC is computed as a result of the optimization methods disclosed in this patent application. Each service group directly controls how their leased vRBs are allocated to the individual traffic flows. To allocate vRBs to individual traffic flows, each vMAC runs its own scheduling algorithm. The MAC layer in the base station of the MNO is then responsible for mapping these vRBs onto one or more RBs.

In this virtualization architecture, the mobile network operator (MNO) is responsible for providing medium access control (MAC) (220 in FIG. 2) and wireless transmission as well as reception at each base station. Each resource block (RB) corresponds to a particular set of wireless channels (e.g., sub-bands and time slots as in 240 in FIG. 2). The MNO has full control over which RB maps (250) to the wireless channels (240). This mapping is typically described in wireless standards. In FIG. 2, wireless channels are two-dimensional resources with orthogonal time slots and frequency sub-bands as in the case of LTE systems. The invention covers any other channelization strategies (orthogonal or non-orthogonal channels) without loss of generality. MAC (220) has a fixed number of resource blocks (RB). Unlike traditional systems, where MAC layer assigns resource blocks directly to wireless user equipment (UE), MAC layer in this invention is assumed to assign physical resource blocks (RBs) to virtual Resource Blocks (vRBs). Block 230 in FIG. 2 depicts this stage, i.e., vRB to RB Mapper. The mapping logic and strategy depends on the type of services, guarantees, and other optimization objectives the MNO determines.

The MNO virtualizes the medium access control by instantiating virtual MAC (vMAC) slices within a base station for distinct service groups serving their own users over the same physical network. The service groups may be composed of a multiple number of vMAC slices, one at each distinct base station in a given geography. The MAC layer virtualizes its resource blocks and assigns vRBs to virtual MAC layers. In FIG. 2, three such service groups and their respective vMACs (201, 202, 203) are shown as examples. The first service group with vMAC (201) is allocated (i+1) vRBs (261), the second service with vMAC (202) is allocated (j+1) vRBs (262), and the third service with vMAC (203) is allocated (k+1) vRBs (263). The number of vRBs assigned to each vMAC is computed as a result of the optimization methods disclosed in this patent application. Each service group directly controls how their leased vRBs are allocated to the individual traffic flows. To allocate vRBs to individual traffic flows, each vMAC runs its own scheduling algorithm. Each service group programs its own scheduling logic in its respective vMAC instance. Different vMACs can utilize the same or different scheduling algorithms. In FIG. 2, the boxes (211), (212), & (213) labeled "Flow to vRB Mapper" runs these scheduling logics. The MAC layer in the base station (e.g., 220 in FIG. 2) of the MNO is then responsible for mapping these vRBs onto one or more RBs (e.g., 230 in FIG. 2). The scheduling decisions taken in (211), (212), (213), and the vRB to RB mapping decision taken in (230) jointly determine which flow packets are assigned to which RB and hence the wireless channels.

In a typical embodiment, the control and user plane of both MAC and vMAC layers of both RATs are decoupled from each other, where the control plane monitors the queue, flow, channel states and makes scheduling decisions while the user plane processes the byte streams from each flow and carries out the wireless transmission/reception.

Figure 3:
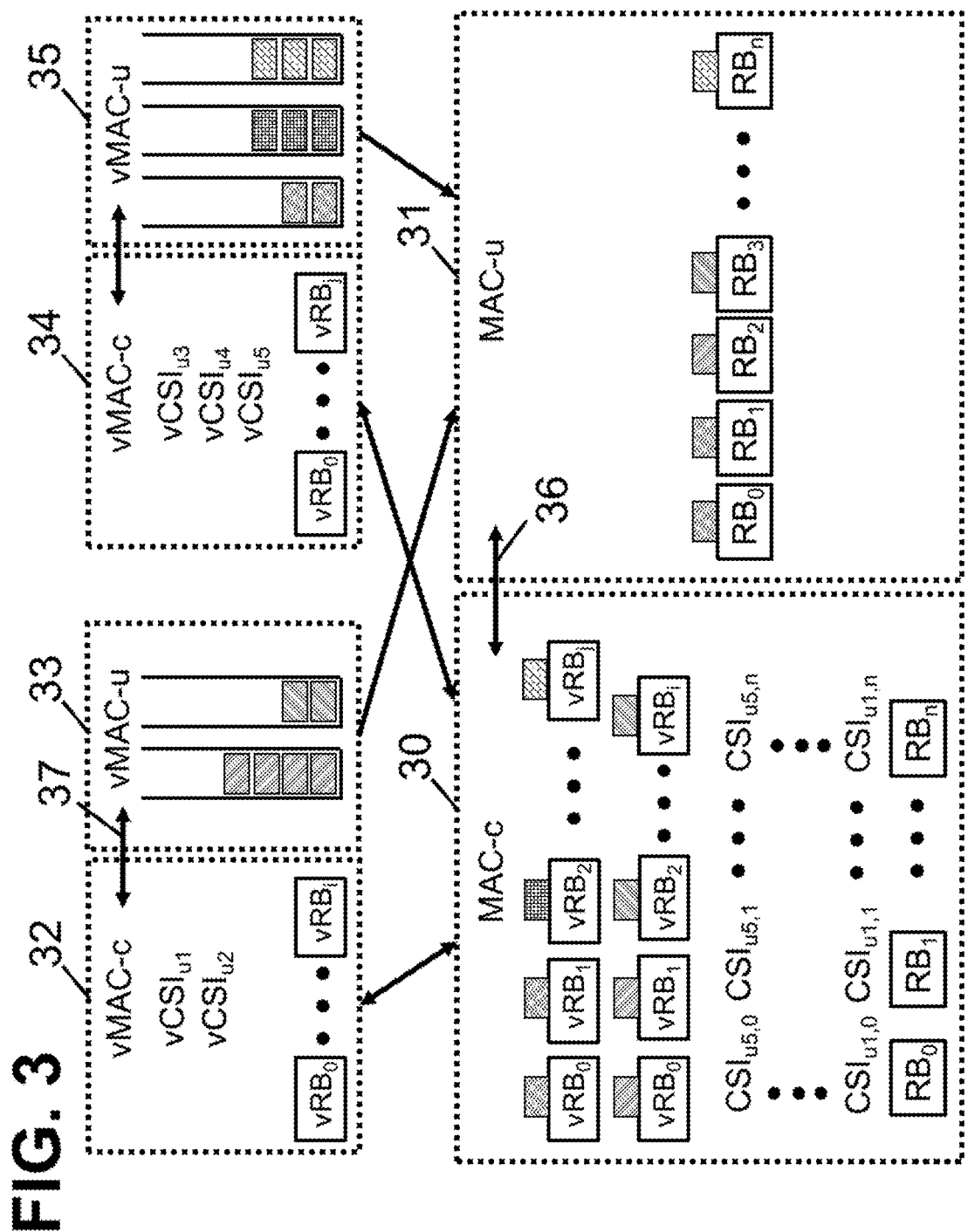

FIG. 3 illustrates an example of control plane and data/ user plane split in the virtual MAC and physical MAC layers at the WWAN BS, as well as the interfaces in between. The control plane of vMAC (vMAC-c) and user plane of vMAC (vMAC-u) together constitute the vMAC for a given service group. Similarly, the control plane of MAC (MAC-c) and user plane of MAC (MAC-u) constitute the MAC layer of MNO. MAC-c has per-UE, per-RB channel state information. In the preferred embodiment, the MAC layer provides each vMAC only per user virtual CSI (vCSI). Using its own scheduling algorithm, each vMAC-c performs flow to vRB assignment based on vCSI and flow information and informs MAC-c about these assignment decisions. The MAC-c makes the final assignment of resource blocks to individual flows.

FIG. 3 shows two vMACs that belong to two service groups. The first vMAC is comprised of (32) and (33), the second vMAC is comprised of (34) and (35). Similarly, the control plane of MAC (MAC-c) and user plane of MAC (MAC-u) constitute the MAC layer of MNO illustrated as (30) and (31) in FIG. 3, respectively. MAC-c has per-UE, per-RB channel state information, $CSI_{UE,RB}$, which can be obtained via measurements at the WWAN base stations, reports by the UEs, and interpolation. In the preferred embodiment, the MAC layer provides each vMAC only per user vCSI (e.g., $vCSI_{u1}$, $vCSI_{u2}$ for the two users of vMAC (32) in FIG. 3). The per user vCSI is the same for all vRBs allocated to the said vMAC. The vMAC-c also has knowledge of the number of vRBs assigned to its service group by the MAC-c, which is determined as a result of the optimization disclosed in this patent application. In FIG. 3, per user channel state information is shown as $vCSI_{ui}$ representing the virtual CSI for user ui. According to FIG. 3, the first vMAC has two active flows and the second vMAC has three active flows. vMAC-u performs buffer management for these flows and share buffer state as well as flow information with vMAC-c through an internal interface (e.g., 37 in FIG. 3). Using its own scheduling algorithm, each vMAC-c performs flow to vRB assignment based on $vCSI_{ui}$ and flow information and informs MAC-c about these assignment decisions. The MAC-c, with the knowledge of flow assignment decisions to vRBs assigned to each vMAC and using the per resource block CSI information for each user ($CSI_{ui,j}$), makes the final assignment of resource blocks to individual flows and communicates this decision with an internal interface (36) to MAC-u. The MAC-u then directly pulls the packets from each vMAC-u based on the assignment by MAC-c to fill the transmission buffers for each resource block.

Figure 4:
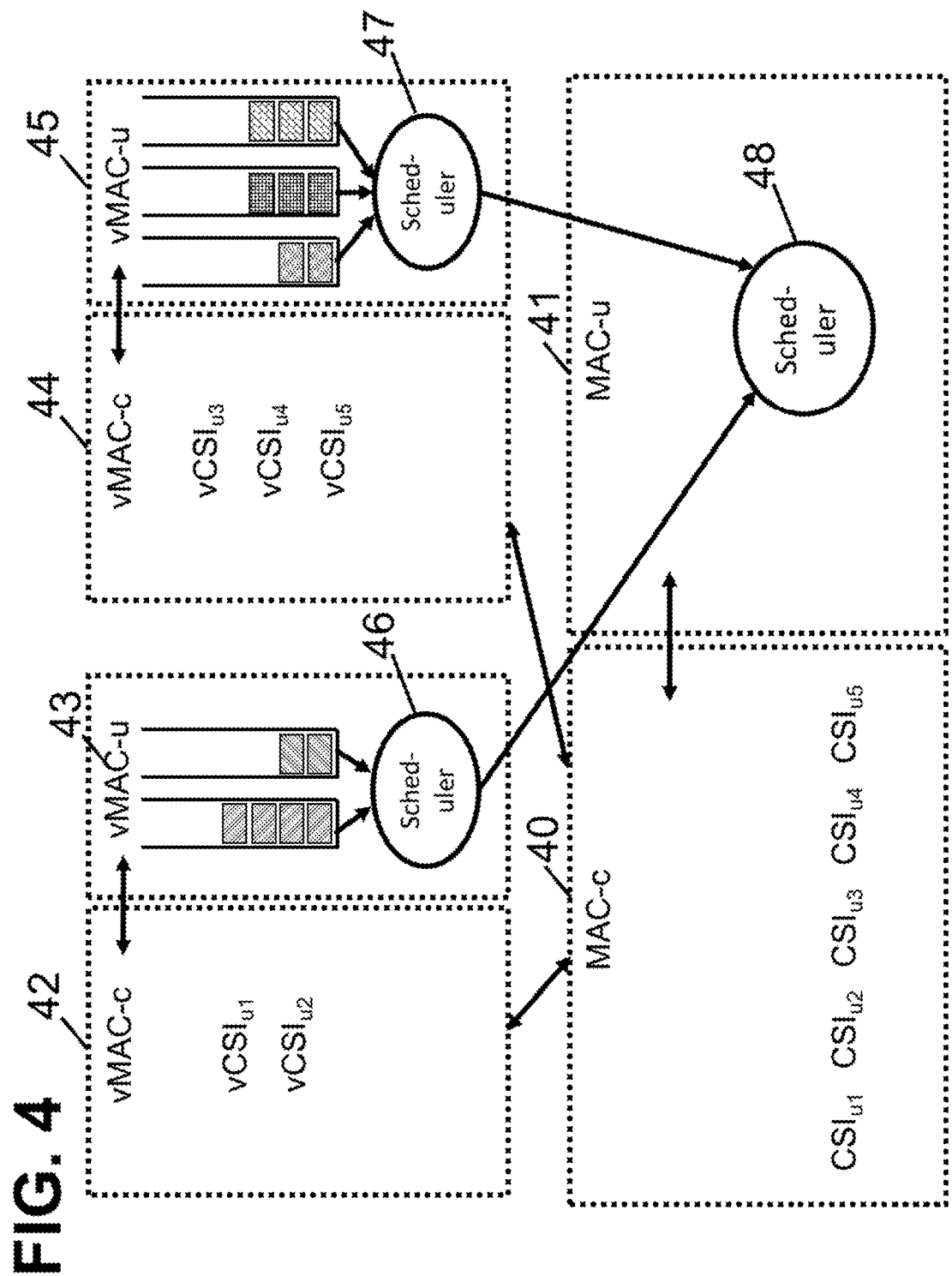
FIG. 4 illustrates a similar decoupling of the control and user planes of MAC and vMAC entities at the WLAN AP.

FIG. 4 illustrates a similar decoupling of the control and user planes of MAC and vMAC entities at the WLAN AP. In the figure, two service groups are assumed. It is assumed that WLAN accesses the channel randomly. Thus, MAC and vMAC schedulers send the data packets in the queues to the wireless channel one by one, whenever the AP has access. The types and parameters of the schedulers are controlled by the vMAC-c and MAC-c entities. The MAC-c periodically obtains per UE channel state information. The MAC-c uses the per UE CSI information to compute per UE virtual CSI information. Using the vCSI information, MAC-c entities compute an expected throughput for each flow and pass this information to a controller program in the WWAN AP. The WWAN AP computes optimal data rate splitting for each flow and informs the vMAC-c and MAC-c entities about the per flow data rate to be served by WLAN. Using these per flow data rates, the vMAC-c and MAC-c configure their schedulers.

The control plane of vMAC (vMAC-c) and user plane of vMAC (vMAC-u) together constitute the vMAC for a given service group. As such, there are two vMACs that belong to the two service groups. The first vMAC is comprised of (42) and (43), the second vMAC is comprised of (44) and (45). Similarly, the control plane of MAC (MAC-c) and user plane of MAC (MAC-u) constitute the physical MAC layer of the WLAN AP, illustrated as (40) and (41) in FIG. 4, respectively. For the sake of illustration, we assume IEEE 802.11 family for the WLAN. As such, the wireless resources are not channelized as in the WWAN case. It is assumed that a single wireless channel is shared between the flows of an AP and with the other APs and users on the same channel in a random access fashion. As such, the allocation of WLAN wireless resources to service groups is performed by configuring WLAN MAC and WLAN vMAC schedulers appropriately, e.g., by setting rates, priorities, maximum rates, etc. of the schedulers. These schedulers, which are denoted by (46), (47) and (48) in FIG. 4, send the data packets in the queues in the vMAC-u entities to the wireless channel one by one, whenever the AP has access. The types and parameters of the schedulers are controlled by the vMAC-c and MAC-c entities. The MAC-c periodically obtains per UE channel state information, which is shown by CSIui in the figure. CSIui is the channel state information for user ui. The channel state information contains, and is not limited to, the wireless channel busy and idle statistics, the wireless channel noise level, per UE received signal strength/quality indicator, per flow instantaneous achieved data rate, per UE and per MCS packet error rate statistics, etc. The MAC-c uses the per UE CSI information to compute per UE virtual CSI information, which are denoted by vCSIui. vCSI information may be identical to CSI information, or they may be a function of CSI information for the purpose of optimization of a network utility function. Using the vCSI information, MAC-c entities compute an expected throughput for each flow and pass this information to a controller program in the WWAN AP. The WWAN AP computes optimal data rate splitting for each flow and informs the vMAC-c and MAC-c entities about the per flow data rate to be served by WLAN. Using these per flow data rates, the vMAC-c and MAC-c configure their schedulers in the user plane to slice the wireless resources in a manner to be able to serve the specified data rates. For example, assuming that the WLAN AP runs a Linux based operating system, these hierarchical schedulers in the MAC-u and vMAC-u entities can be realized using the classful queueing disciplines that are available in the Linux kernel. Given the data rates for each flow, the MAC-u and vMAC-u configure the types and parameters of the queuing disciplines in their scopes accordingly.

Figure 5:
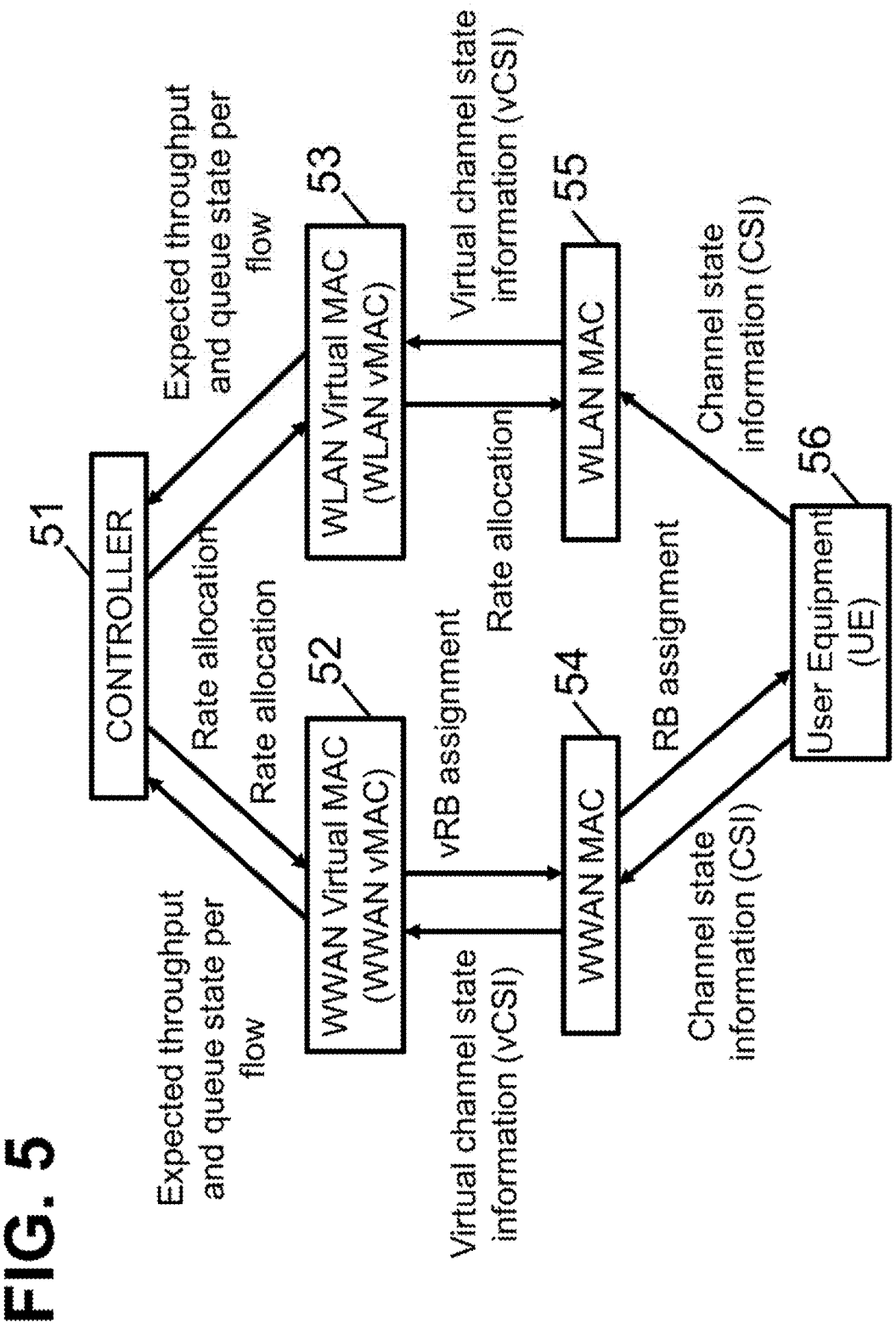
FIG. 5 shows the information flow between various entities in a WWAN-WLAN aggregating network.

FIG. 5 shows the information flow between various entities in a WWAN-WLAN aggregating network. The MAC layers of both WWAN and WLAN collect channel state information from the UE. Both MAC layers compute virtual CSI (vCSI) information per UE as a function of the CSI information gathered from the UEs. Using the vCSI information, both vMAC entities compute an expected throughput per flow they serve and pass this information to the controller. The queue states, such as the number of packets in the queues, dequeueing rates, etc., are also passed to the controller. The controller jointly optimizes the data splitting ratios of the flows into the two radios. The optimized flow rates are then passed back to the vMAC entities. The WWAN vMAC decides on the number of vRBs that it needs in order to fulfil these rates and requests them from the WWAN MAC. Then given the vRBs, the packets from flows are assigned on the vRBs as explained in FIG. 3. The WWAN MAC then maps the vRBs to actual RBs and conducts wireless transmissions accordingly. Given the optimal rate allocations from the controller, the WLAN vMAC and MAC entities construct and control the schedulers to fulfil these rates as explained in FIG. 4.

The WWAN MAC (54) and WWAN vMAC (52) entities reside in a WWAN BS. The WLAN MAC (55) and WLAN vMAC (53) entities reside in the WLAN AP. The controller (51) may reside in the WWAN BS, in the EPC, or in fact it may be realized anywhere, such as in the cloud. The MAC layers of both WWAN and WLAN (54, 55) collect channel state information from the UE (56). For the WWAN, the channel state information may be the channel quality indicator (CQI) per UE and per resource block (RB). If the CSI information for some UEs or RBs are not available, these may be interpolated/estimated from CSI information of other UEs and/or RBs. For the WLAN, the channel state information contains, and is not limited to, the wireless channel busy and idle statistics, the wireless channel noise level, per UE received signal strength/quality indicator, per flow instantaneous achieved data rate, per UE and per MCS packet error rate statistics, etc. Similarly, missing information for some UEs may be interpolated/estimated from existing CSI. The WWAN MAC-c computes virtual CSI (vCSI) information per UE as a function of the CSI information per UE and per RB. As explained above, in the preferred embodiment, the vCSI values are same for all vRBs for a given UE. The WLAN MAC-c uses the per UE CSI information to compute per UE virtual CSI information. In this case vCSI information may be identical to CSI information, or they may be a function of CSI information for the purpose of optimization of a network utility function. Using the vCSI information, both vMAC entities compute an expected throughput per flow they serve and pass this information to the controller. The queue states, such as the number of packets in the queues, dequeueing rates, etc., are also passed to the controller. Using this information and other flow information such as rates and QoS requirements of the flows, the utility functions and service level agreements of the service groups that the flows belong, the BS/AP loads, etc., the controller jointly optimizes the data splitting ratios of the flows into the two radios. At the end of this optimization, some flows may be completely served by the WWAN, which amounts to a 100%-0% split between the WWAN and WLAN, respectively, some flows may be completely served by the WLAN, which amounts to a 0%-100% split between the WWAN and WLAN, respectively, and some flows may be served by both radios, which amounts to a x %-100-x % split between the WWAN and WLAN, respectively. The value of x for each such flow is also an output of the optimization. The optimization goals may include, and are not limited to, network utility maximization, efficient use of wireless resources, throughput maximization, QoS provisioning, load balancing, etc. The optimized flow rates are then passed back to the vMAC entities (52, 53). The WWAN vMAC (52) decides on the number of vRBs that it needs in order to fulfil these rates and requests them from the WWAN MAC (54). Then given the vRBs, the packets from flows are assigned on the vRBs as explained in FIG. 3. The WWAN MAC (54) then maps the vRBs to actual RBs and conducts wireless transmissions accordingly. Given the optimal rate allocations from the controller, the WLAN vMAC (53) and MAC (55) entities construct and control the schedulers to fulfil these rates as explained in FIG. 4.

In the preferred embodiment, the CSI information and other information (such as flow rates, profile properties, etc) are queried periodically and the optimization is updated with the new information. In another embodiment, the information query and the following optimizations are triggered by specific events, such as the measurement reporting events in LTE. In another embodiment, in between the queries of updated CSI information and/or other optimization inputs, the optimizations/operations at the controller (rate allocation) and MAC and vMAC entities (vCSI and expected throughput computations, flow to vRB mapping, vRB to RB mapping, scheduler parameter setting) are performed in an iterative fashion until convergence.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a system and method for service group based dynamic optimization of WWAN WLAN aggregation. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:

1. A system for service group based dynamic optimization of WWAN and WLAN aggregation in a user equipment (UE), the UE comprising:
   a first radio access technology (RAT) interface, the first RAT interface comprising a Wireless Wide Area Network (WWAN) based interface that is served by a corresponding base station (BS);
   a second RAT interface, the second RAT interface comprising a Wireless Local Area Network (WLAN) based interface that is served by an Access Point (AP);
   wherein, for downlink communications, the first and second RAT interfaces are aggregated; and
   wherein the UE belonging to at least one service group, the at least one service group being associated with a group profile: (a) defining a collection of attributes, the attributes comprising any of, or a combination of, UEs, BSs, and Applications for which the group profile is defined for, and (b) defining dynamic optimization by determining percentage of wireless resources allocated to the at least one service group, downlink and uplink data rate limits assigned to the at least one service group; and
   wherein the UE performs service group based dynamic optimization of WWAN and WLAN aggregation, where flow split ratios and resource allocation between the first and second RAT interfaces are optimized jointly for each service group and is optimized for each RAT interface according to the group profile.

2. The system of claim 1, wherein the base station is any of the following: a macro base station or a small cell base station.

3. The system of claim 1, wherein one or more control algorithms associated each service group is any of the following: admission control algorithm, scheduling algorithm, or handover algorithm.

4. The system of claim 1, wherein the UE belongs to different service groups at different times and/or different locations.

5. The system of claim 1, wherein the UE offloads data flow to the WLAN AP and then transmits to a destination UE via the WLAN based interface only.

6. The system of claim 1, wherein the UE splitting a data flow into a first and second data flows, and sends the first data flow to the destination UE via the WWAN based interface, and sends the second data flow to the destination UE via the WLAN AP and then transmits to the destination UE via the WLAN based interface.

7. The system of claim 6, wherein optimization of the splitting is performed dynamically using any of, or a combination of, the following information: link qualities, signal strength/quality indicators, instantaneous traffic rates.

* * * * *